J. R. Lomas.
Tremolo for Organs and Melodeons.

117550  PATENTED AUG 1 1871

Witnesses:
A. Bennerendorf.
Francis McArdle.

Inventor:
J. R. Lomas.
per Munn & Co.
Attorneys.

UNITED STATES PATENT OFFICE.

JOHN R. LOMAS, OF NEW HAVEN, CONNECTICUT, ASSIGNOR TO B. SHONINGER, OF SAME PLACE.

IMPROVEMENT IN TREMOLOS FOR ORGANS AND MELODEONS.

Specification forming part of Letters Patent No. 117,550, dated August 1, 1871.

*To all whom it may concern:*

Be it known that I, JOHN R. LOMAS, of New Haven, in the county of New Haven and State of Connecticut, have invented a new and Improved Tremolo for Organs and Melodeons; and I do hereby declare that the following is a full, clear, and exact description thereof, which will enable others skilled in the art to make and use the same, reference being had to the accompanying drawing forming part of this specification, in which—

Figure 1:
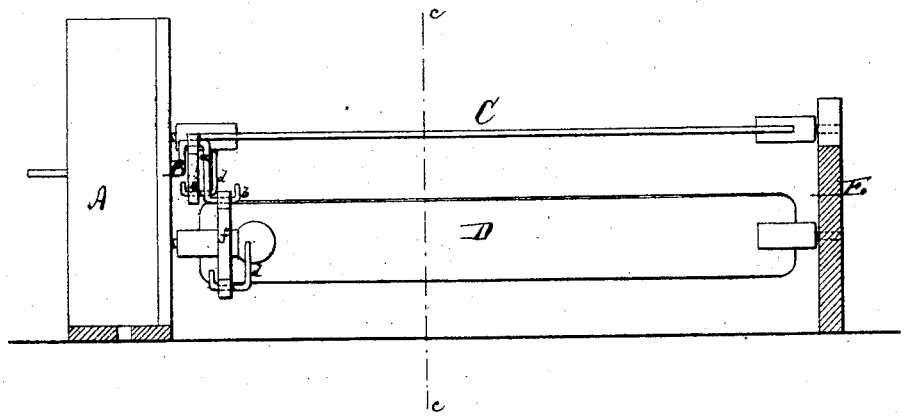
Figure 2:
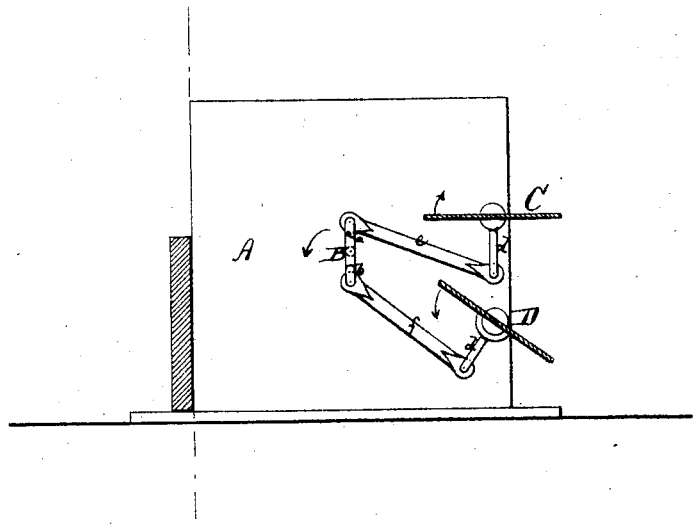

Figure 1 represents a side elevation of my improved tremolo attachment to organs and melodeons. Fig. 2 is a vertical transverse section of the same on the line *c c*, Fig. 1.

Similar letters of reference indicate corresponding parts.

This invention has for its object to remove the strain from the shaft of the wind-wheel and overcome the consequent friction and rattling noise produced when such wheel is connected with an oscillating wing or fan which acts as a tremolo for an organ or melodeon. The invention consists in the use of two wings or fans, which are connected with opposite cranks, and therefore vibrated in opposite directions, so that one will balance the other, thus keeping an even strain on the power applied, making it work with ease, without noise, and producing a perfect tremolo and beautiful effect on the music.

A in the drawing represents the wind-wheel case. Within it is arranged the wheel in suitable manner and operated in the ordinary way. The wind-wheel shaft B has two cranks, *a b*, opposite each other. C and D are two thin strips of wood or other material pivoted parallel to each other in a stationary frame, E, in the way of the sound-waves. Cranks *d d* on the pivot-pins of these wings C D are, by rods *e f*, respectively connected with the cranks *a b*, as shown. As the wind-wheel revolves it will oscillate the wings in opposite directions, which will cause them to balance each other for the purpose above indicated.

Having thus described my invention, I claim as new and desire to secure by Letters Patent—

The tremolo-wings C D, connected with the opposite cranks of the wind-wheel shaft so that they balance each other, substantially as herein shown and described.

JOHN R. LOMAS.

Witnesses:
    H. LYNDE HARRISON,
    D. R. WRIGHT.